HIRAM C. LUCE AND WILLIAM L. RABE, OF BLOOMINGTON, ILLINOIS.

*Letters Patent No. 86,989, dated February 16, 1869.*

IMPROVED COMPOUND FOR THE MANUFACTURE OF VINEGAR.

The Schedule referred to in these Letters Patent and making part of the same.

Be it known that we, HIRAM C. LUCE and WILLIAM L. RABE, of the city of Bloomington, county of McLean, and State of Illinois, have invented a new and useful Composition from which Vinegar is Produced; and we do hereby declare that the following is a full and accurate description of the ingredients that compose the same.

In order to produce one barrel of vinegar, we mix, with nearly that quantity of water, one and a quarter gallon of pure cider, four gallons of molasses or twenty pounds of common brown sugar, one gallon yeast, and one fluid ounce of acetic ether or half ounce of artificial pear-oil, and let the mixture stand six weeks, and in the same proportion for a larger quantity. These ingredients, mixed in the proportions named, produce vinegar of ordinary strength for common use. When stronger vinegar is required, these ingredients must be mixed in larger proportions to the quantity of water used.

Whenever cider cannot be obtained, alcohol can be used as a substitute, in the proportion of one eighteenth of an ounce of alcohol to four-ninths of an ounce of cider.

What we claim as our invention, and desire to secure by Letters Patent, is—

The production of vinegar, by combining the ingredients above mentioned, consisting of water, cider or alcohol, molasses or common brown sugar, yeast, and acetic ether or artificial pear-oil, substantially as shown and described.

H. C. LUCE,
W. L. RABE.

Witnesses:
 H. C. LATHAM,
 GEO. O. MARCY.